(12) United States Patent
Mohaddes Khorassani

(10) Patent No.: US 10,958,190 B2
(45) Date of Patent: Mar. 23, 2021

(54) MULTI-LEVEL VOLTAGE SOURCED CONVERTER

(71) Applicant: Transgrid Solutions Inc., Winnipeg (CA)

(72) Inventor: Mojtaba Mohaddes Khorassani, Winnipeg (CA)

(73) Assignee: TransGrid Solutions Inc., Winnipeg (CA)

( * ) Notice: Subject to any disclaimer, the term of this patent is extended or adjusted under 35 U.S.C. 154(b) by 0 days.

(21) Appl. No.: 16/609,271

(22) PCT Filed: Mar. 28, 2018

(86) PCT No.: PCT/CA2018/050384
§ 371 (c)(1),
(2) Date: Oct. 29, 2019

(87) PCT Pub. No.: WO2018/201225
PCT Pub. Date: Nov. 8, 2018

(65) Prior Publication Data
US 2020/0091835 A1    Mar. 19, 2020

Related U.S. Application Data

(60) Provisional application No. 62/501,948, filed on May 5, 2017.

(51) Int. Cl.
*H02M 7/483* (2007.01)
*H02M 7/5387* (2007.01)

(52) U.S. Cl.
CPC ....... *H02M 7/483* (2013.01); *H02M 7/53871* (2013.01); *H02M 2007/4835* (2013.01)

(58) Field of Classification Search
CPC . H02M 2007/4803; H02M 2007/4822; H02M 2007/4835; H02M 7/42; H02M 7/48; H02M 7/487; H02M 7/493; H02M 7/501; H02M 7/4826; H02M 7/49; H02M 7/4807; H02M 7/537; H02M 7/5387; H02M 7/533; H02M 7/53; H02M 7/53871
USPC ............... 363/35–37, 132–135, 136, 137
See application file for complete search history.

(56) References Cited

U.S. PATENT DOCUMENTS

| | | | |
|---|---|---|---|
| 6,519,169 B1 | 2/2003 | Asplund et al. | |
| 2010/0309698 A1* | 12/2010 | Asplund | H02J 3/36 363/126 |
| 2013/0704950 | 3/2013 | Jonsson et al. | |
| 2015/0229234 A1* | 8/2015 | Park | H02M 1/12 363/78 |

* cited by examiner

*Primary Examiner* — Bryan R Perez
(74) *Attorney, Agent, or Firm* — Ade & Company Inc.; Christopher J. Dynowski; Ryan W. Dupuis

(57) ABSTRACT

A voltage sourced converter for converting power from DC to AC features a chain of power electronic modules in between which each AC connection of the converter is made so as to form a series string or arm of the modules on at least one side of that connection to the chain which are controlled so as to produce at this connection an AC voltage waveform.

11 Claims, 8 Drawing Sheets

MULTI-LEVEL VOLTAGE SOURCED CONVERTER

This application is a national phase filing of PCT/CA2018/050384 and claims the benefit under 35 U.S.C. 119(e) of U.S. Provisional Application Ser. No. 62/501,948 filed May 5, 2017.

FIELD OF THE INVENTION

The present invention relates generally to voltage sourced converters, and more particularly to modular multi-level voltage sourced converters.

BACKGROUND

Electrical power is normally transmitted from one location to another using alternating current (AC). In some cases it is economically or technically beneficial to convert the alternating current to direct current (DC) and transmit power in DC form. At the receiving end power is again converted from DC back to AC. There are also many other industrial applications where electrical power is required to be converted from AC to DC or from DC to AC. In all these cases conversion is generally done by electronic converters that use high power semiconductor devices such as thyristors, diodes, insulated gate bipolar transistors (IGBT), gate turn off thyristors (GTO) and similar electronic devices.

To date the most commonly used converters are the Line Commutated Converters (LCC) and the Voltage Sourced Converters (VSC). Generally speaking, voltage sourced converters are power electronic circuits usable for converting electrical power between AC and DC and which in some applications are used for generating or absorbing reactive power.

A VSC can be built in various designs, the most commonly used design today is the Modular Multilevel Converter (MMC) configuration. As shown in FIG. 1, a typical, well-known configuration 1 of MMC includes two arms for each of its phases A, B, and C of the converter, an upper arm 3 and a lower arm 4. Thus, a three phase converter has six arms of modules. Each arm includes a number of modules connected in series. In series with each arm a reactor may be connected. Each module includes at least one capacitive element, each typically a capacitor, and two or more electronic switches to allow the capacitor to be inserted into the circuit (either in forward or reverse direction), bypassed or blocked. A number of possible module configurations are available, today the most commonly used configurations are the Half Bridge (HB) and Full Bridge (FB) configurations. A module can use various power electronic devices for switching currents. Today the most commonly used devices are IGBT, IEGT (injection-enhanced gate transistor), IGCT (integrated gate-commutated thyristor) and diodes. The IGBT and diode switches can be made out of a single IGBT or diode component or a number of IGBT or diodes connected in series or parallel to create an IGBT or diode valve. During the normal operation of the converter, modules are switched on or bypassed in a controlled manner to cause the desired AC and DC currents flow through the converter terminals.

A converter made with MMC technology for high voltage applications normally requires a large number of modules which takes up a considerable amount of space.

SUMMARY OF THE INVENTION

It is one object of the invention to provide a topology for a modular multi-level voltage sourced converter.

According to an aspect of the invention there is provided a voltage sourced converter comprising:

a plurality of AC terminals and a DC terminal between which electrical power is transferred;

a plurality of power electronic modules each including at least one capacitive element arranged to maintain a predetermined voltage and electronic switches operatively connecting the at least one capacitive element to terminals of the respective module such that current can be guided through or to bypass the at least one capacitive element;

the modules being connected in a chain between two connections defining the DC terminal such that DC current passing through the DC terminal passes through the chain of the modules;

the AC terminals being connected to the chain at prescribed locations between the modules in the chain so that on at least one side of each connection is formed an arm of the modules;

a plurality of DC-blocking capacitive elements each connected between a respective one of the AC terminals and the corresponding respective connection at the chain such that the DC current passing through the chain is prevented from propagating out of the AC terminals beyond the converter;

a controller for controlling the modules so as to (i) form an AC voltage waveform at each AC terminal, (ii) maintain the predetermined voltage of each of the at least one capacitive element of the respective module, and (iii) maintain a total voltage of all the modules which are operated to have current passed through the at least one capacitive element thereof substantially equal to a voltage at the DC terminal;

each arm including a prescribed number of the modules which is related to the sum of the magnitude of a peak AC voltage which can appear across the respective arm and a DC voltage drop across the respective arm.

This arrangement of modules in a MMC type of converter can employ fewer modules than the conventional arrangement for the same number of AC terminals or phases (i.e., when there are more than one) and therefore can be more economical.

In some arrangements there are no modules between a respective one of the connections nearest one of the two connections of the DC terminal.

Alternatively, in other arrangements there is an arm of the modules on either side of said each connection of a respective one of the AC terminals to the chain.

In one arrangement the voltage sourced converter includes an AC path across the two connections of the DC terminal for reducing propagation of the AC current to the DC terminal. In some arrangements flow of AC current into the DC system is allowed and therefore an AC path may not be used.

The AC path may be formed by at least one fundamental frequency filter.

In one arrangement there is provided a fundamental frequency filter for each phase defined by the respective AC terminal, the fundamental frequency filter being connected in a manner forming a closed loop with the respective AC terminal and the arms on either side of the connection thereof.

In one arrangement there is provided another chain of the power electronic modules connected between the two connections of the DC terminal such that DC current passing through the DC terminal passes through the another chain of the modules, the AC terminals being connected to the another chain at prescribed locations between the modules thereof so that on at least one side of each connection is formed an arm of the modules including a prescribed number of the modules such that the modules of the another chain additionally provide AC current to the AC terminals, and the modules of all chains being controllable by the controller such that there is substantially no AC current passing through to the DC terminal. Thus in this arrangement the additional chain of modules forms an AC path so that there is substantially no AC current passing through to the DC terminal, and this additional chain may augment the AC power output of the converter at the same AC terminals to which the first chain of modules is connected. In other arrangements such additional chains of modules may be connected to different AC terminals defining different phases from those of the first chain.

As such, the total DC current passing through the DC terminal is divided between each chain of modules such that only a portion of this total DC current flowing into the voltage sourced converter flows through each chain of modules.

In some arrangements the prescribed number of the modules is proportional to the sum of the DC voltage drop across the arm and the magnitude of the peak AC voltage across the arm. For instance, in an arrangement where each module is rated for 2 kV and the peak AC voltage across the arm is 50 kV and the DC voltage across the arm is 100 kV, the prescribed number of the modules in each arm is 75. However, in other arrangements certain other considerations may have to be taken into account such that the number of modules in each arm may no longer be proportional to the sum of the DC voltage and the magnitude of the peak AC voltage across the arm, for example the need for redundant modules to achieve desired converter reliability level or the need for additional modules to increase the arm switching or lightning impulse voltage withstand levels.

The respective module may be of the type selected from the group consisting of half bridge, full bridge, and semi-full bridge. There are other types of modules known to the person skilled in the art and new types of modules which may be developed in the future that may be suitable in the voltage sourced converter of the present invention.

Typically there are three AC terminals each for one phase of an AC system to which the voltage sourced converter is connected. Most applications of such a voltage sourced converter are for three phase systems.

Typically there is provided a capacitive element connected between a respective one of the AC terminals and the corresponding respective connection at the chain so as to block propagation of the DC current to the respective one of the AC terminals.

In one arrangement between each AC terminal and the corresponding respective connection at the chain is a respective one of the DC-blocking capacitive elements.

In another arrangement there is a DC-blocking capacitive element connected between each AC terminal and the corresponding respective connection at the chain except for one AC terminal which is connected directly to the respective connection at the chain. In such an arrangement there remains at least one DC-blocking capacitive element in each closed path along which DC current may flow out of the converter which acts to block the DC current flowing out from all AC terminals of the converter.

There may be provided a plurality of reactors each connected in series with the respective arm.

The arrangement of voltage sourced converter described hereinabove is suited for use in High Voltage Direct Current (HVDC) or Medium Voltage Direct Current (MVDC) or in reactive power compensation applications.

BRIEF DESCRIPTION OF THE DRAWINGS

Arrangements of the invention will now be described in conjunction with the accompanying drawings in which.

In the drawings like characters of reference indicate corresponding parts in the different figures.

DETAILED DESCRIPTION

In FIGS. 5-11 is shown a voltage sourced converter (VSC) 10, which is generally of the modular multilevel converter (MMC) type or configuration, for converting electrical power from DC to AC and vice versa. As understood in the art, in such converters power is able to flow in either direction, from the DC side to the AC side, or vice versa.

Figure 2:
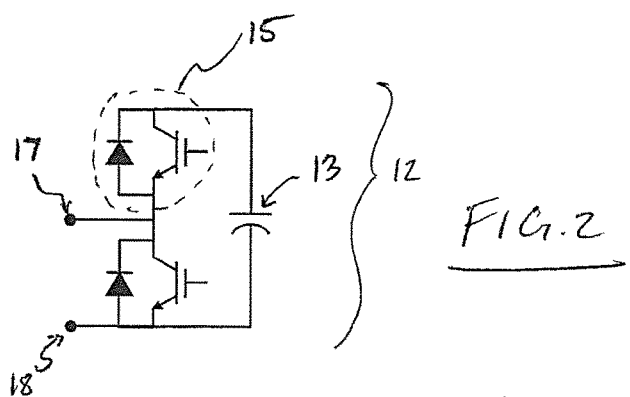
FIG. 2 is a schematic diagram of a conventional half-bridge module with IGBT and diode switches that is usable in a voltage sourced converter.
Figures 3, 4:
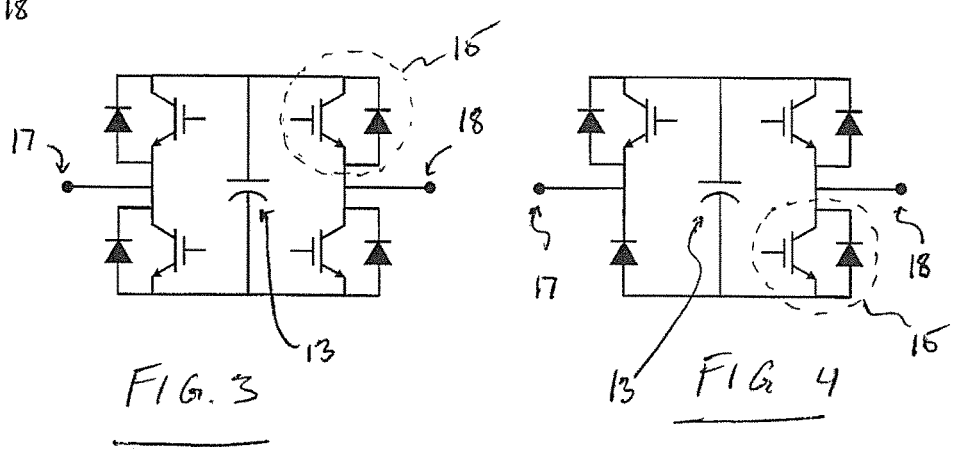
FIG. 3 is a schematic diagram of a conventional full-bridge module usable in a voltage sourced converter.
FIG. 4 is a schematic diagram of a conventional semi-full bridge module usable in a voltage sourced converter.

Generally speaking, the VSC 10 employs power electronic modules 12 which are shown more clearly in FIGS. 2-4, each arranged to maintain a stable predetermined voltage, acting as "blocks" that are selectively toggled between an off, or bypass, state and an on state at appropriate times so as to superpose to form an AC voltage waveform. Each power electronic module 12 includes at least one capacitive element 13, typically a capacitor, and electronic switches 15 for example IGBTs that are operatively connected to the capacitive element(s) of the module so as to be able to guide current through the module so as to provide one of a predetermined number of voltage values across terminals 17, 18 of the module. More specifically, the electronic switches 15 operatively connect the capacitive element(s) to the terminal connections 17, 18 of the module whereat the module is connected to a larger circuit, and may be operated so as to guide current around, that is bypassing, the capacitive element(s) such that the voltage across the module terminals is effectively zero, or they may be operated so as to guide current through the capacitive element(s) such that the magnitude of the predetermined module voltage sustained by the capacitive element(s) is effectively produced across the module terminals. In some arrangements the module is arranged so that the module current may be guided in forward and reverse directions such that two polarities of the predetermined module voltage can be produced at the module terminals 17, 18. As such, the modules 12 may be for example of the half bridge, full bridge, and semi-full bridge type, though these are just examples and other suitable types of modules may be usable with a MMC style of VSC. The modules are not described in further detail as their construction is known in the art and they are not the focus of the present disclosure.

The VSC 10 has a DC terminal 21 with two connections 21A and 21B and a plurality of AC terminals 23, which are interconnected by a configuration of the power electronic modules 12 that will be described in further detail shortly. The modules 12 are controlled by a controller 25 (schematically shown) according to a control scheme generally known in the art so as to produce AC voltage waveforms at the AC terminals, to maintain the predetermined voltage of each capacitive element 13 of the respective module 12, and to maintain a total voltage of all the modules connected between the connections 21A and 21B of the DC terminal that are operated so that current is passed through their capacitive element(s) 13, i.e. those modules which are not bypassed and thus used to contribute to the AC voltage waveform, substantially equal to the DC terminal voltage. Each AC terminal defines a phase of the VSC. Presently, three phase converters are considered to be most common, and therefore the voltage sourced converter of the present invention is described hereinafter in relation to three phases as indicated at 23A through 23C. However, it will be appreciated that there may be a different number of AC terminals 23, that is one or a plurality of phases each having their own separate connection within the VSC.

Figure 5:
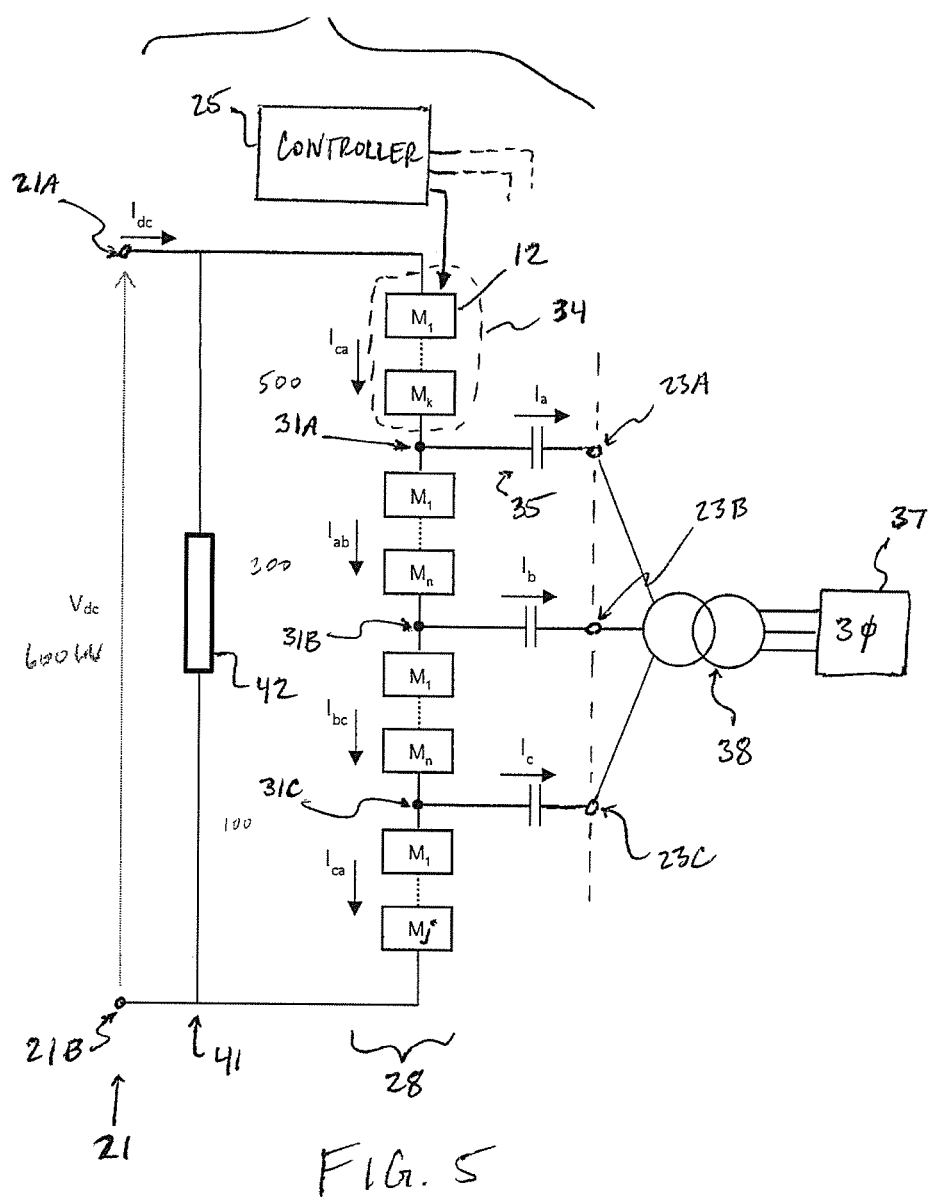
FIG. 5 is a schematic diagram of voltage sourced converter according to an arrangement of the present invention, with three phases and series capacitors at all three AC connections and one fundamental frequency filter at DC terminals.
Figure 6:
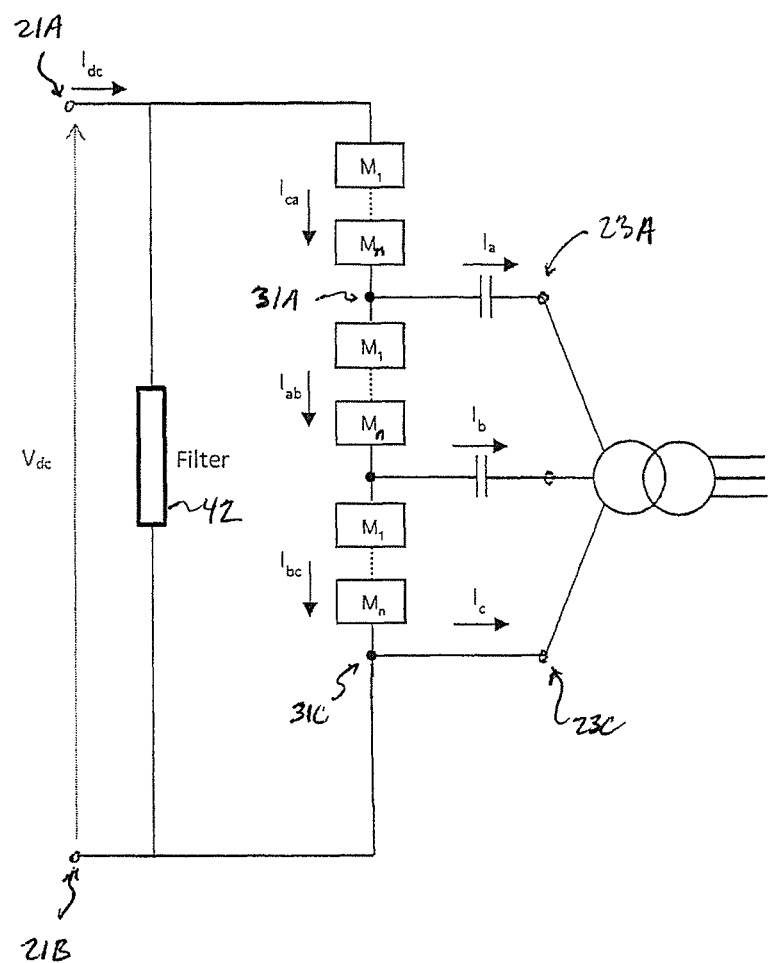
FIG. 6 is a schematic diagram of voltage sourced converter according to an arrangement of the present invention, with one AC terminal lacking an arm of modules between it and a nearest connection of the DC terminal.

As previously mentioned, the DC terminal and the AC terminals are interconnected by a configuration of the modules 12 in which they are connected in a chain 28 between the two DC terminal connections 21A, 21B such that the DC current passing through the DC terminal passes through the chain 28. The AC terminals 23A-23C are connected respectively at 31A-31C to the chain 28 at prescribed locations so that on at least one side of each connection 31A through 31C is formed an arm 34 of the modules. In the arrangement of FIG. 5 there is an arm on either side of the respective connection of one AC terminal 23. In comparison thereto, another arrangement like that shown in FIG. 6 omits that lowermost arm of the modules between nodes 31C and 21B such that AC terminal 23C is now connected to DC terminal connection 21B either directly or through a capacitive element like a capacitor. Similarly in another arrangement which is not shown that uppermost arm between nodes 31A and 21A may be omitted and node 23A connected to 21A directly or through a capacitive element.

Referring back to the illustrated arrangement of FIG. 5, there are k modules forming an upper arm of a first one of the AC terminals that is between nodes 31A and 21A. A lower arm of modules between nodes 31C and 21B comprises j modules.

Furthermore, there are n modules between the first connection 31A corresponding to the first AC terminal or phase 23A and the second connection 31B corresponding to a second AC terminal or phase 23B. This string of modules is affected by the phase-to-phase voltage between 23A and 23B. The upper arm and the lower arm together are affected by the phase-to-phase voltage between nodes 23A and 23C. Therefore, generally speaking, the total number of modules in these two arms k+j is equal to n, that number of modules in each of the middle arms.

Each arm 34 of modules 12 includes a prescribed number of modules, whether k or j or n, that is related to the sum of the magnitude of the peak AC voltage which can appear across that arm of modules and a DC voltage drop thereacross. More specifically, this prescribed number may be proportional to the sum of the magnitude of this peak AC voltage and this DC voltage drop as in the example where each module is rated for 2 kV and (the magnitude of) the peak AC voltage across an arm is 50 kV and the DC voltage across the arm is 100 kV, the prescribed number of the modules in that arm is 75.

However, in a final design which is implemented the number of modules in the respective arm may be different from this initial calculation to account for other factors such as variations in AC system voltage, the need to operate at higher AC voltages to respond to dynamic events, the need for redundant modules to achieve desired converter reliability level and the possible need to increase the arm switching or lightning impulse voltage withstand levels. Furthermore, due to such factors and possibly others known in the art the number of modules in the arm between 31A and 31B may not be exactly equal to the sum of the modules in the upper arm between nodes 21A and 31A and the lower arm between node 31C and 21B.

In the illustrated arrangements of FIG. 5 the two middle arms, that is a first middle arm between nodes 31A and 31B and a second middle arm between nodes 31B and 31C, will likely include the same number of the modules, although they may be different due to factors such as the impulse withstand level requirements. There is some flexibility in the number of modules in the upper arm between nodes 21A and 31A and the lower arm between nodes 31C and 21B. Depending on the DC voltage selected for the nodes 31A, 31B and 31C the number of modules in these two arms can be different. In some arrangements the number of modules in the lower arm (or upper arm) may be reduced to zero (i.e. the lower or upper arm is omitted) and node 31C (or 31A) is directly connected to the node 21B (or 21A). As mentioned before other factors such as required impulse withstand level may also affect the number of modules in each arm.

Figure 1:
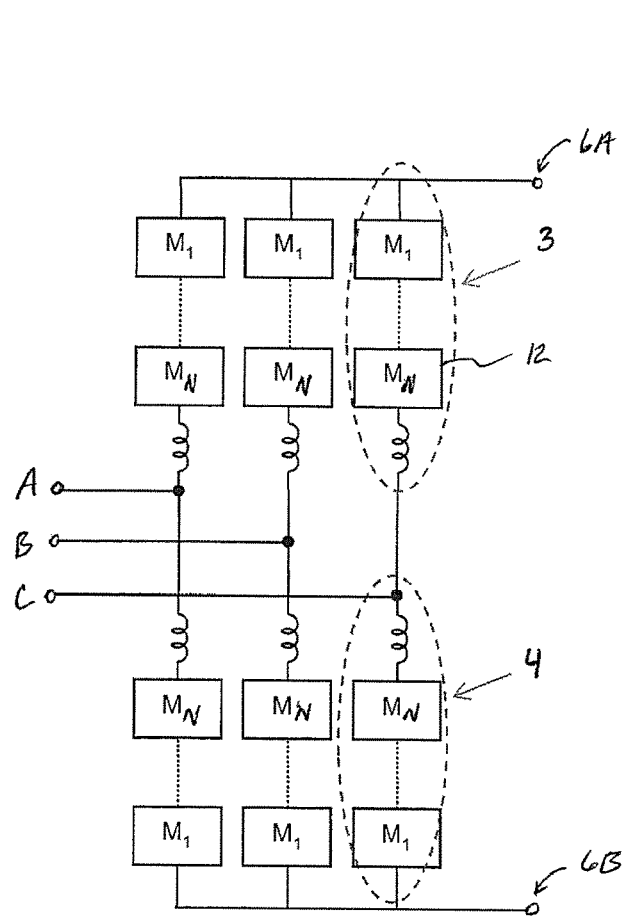
FIG. 1 is a schematic diagram of a typical, well-known arrangement or topology of modular multilevel converter having three phases.

In a conventional MMC converter such as that illustrated in FIG. 1 designed to operate with peak AC voltage less than or equal to half DC voltage, for each phase a total of at least 2N modules each with appropriate voltage rating are used between the DC connections 6A and 6B in order to be able to handle the voltage $V_{dc}$ at the DC terminal of the converter. N is equal to $V_{dc}$ divided by the nominal (rated) voltage of a single module. Therefore a total of at least 6N modules are used for a three phase converter. For comparison, for a converter with the topology of the present invention, as illustrated for example in FIG. 5, designed to operate with peak phase-to-phase AC voltage less than or equal to half the DC voltage across the corresponding arm, will comprise 2N modules in the entire chain between the DC terminal connections 21A and 21B. Each module is assumed to have a voltage rating equal to said conventional three phase MMC converter. Therefore, one-third of the total number of modules used in the conventional topology of FIG. 1 are now used in the VSC 10 making it much more economical. Of course, this VSC 10 is consequently able to transfer less electrical power than the corresponding conventional MMC having an equivalent number of power electronic modules for one phase in series between the DC terminal connections, but this is sufficiently suitable for applications such as where the required converter power rating is considerably lower than what a conventional converter with similar modules can provide.

Typically a capacitive element 35 such as a capacitor is connected between a respective one of the AC terminals 23 and the corresponding respective connection 31 at the chain 28 so as to block propagation of the DC current to the respective one of the AC terminals and out beyond the converter, and is for this reason referred to herein as a DC-blocking capacitive element for convenience of reference. In some arrangements there is a capacitive element 35 connected between each AC terminal and the corresponding respective connection at the chain, as for example shown in FIGS. 5, 9 and 11. In other arrangements not all such paths between the AC connection to the chain 28 and the terminal 23 include such a capacitive element, as for example shown in FIGS. 7 and 10.

In these arrangements the propagation of DC current out of the AC terminal is still blocked because each closed path along which DC current can flow out of the converter at an AC terminal, whether to ground or back to the converter as for example along 31A to 23A through a transformer winding and back along 23C to 31C, includes at least one capacitive element at a location therealong; however, in such arrangements the number of series capacitors is reduced which may reduce the cost and the space required by the VSC.

At the AC terminals 23 may be connected an AC load for example a three-phase motor or an AC power system 37 (schematically shown), typically facilitated by a transformer 38 so as to provide the appropriate voltage ratio between the VSC and the load or power system 37.

Figure 8:
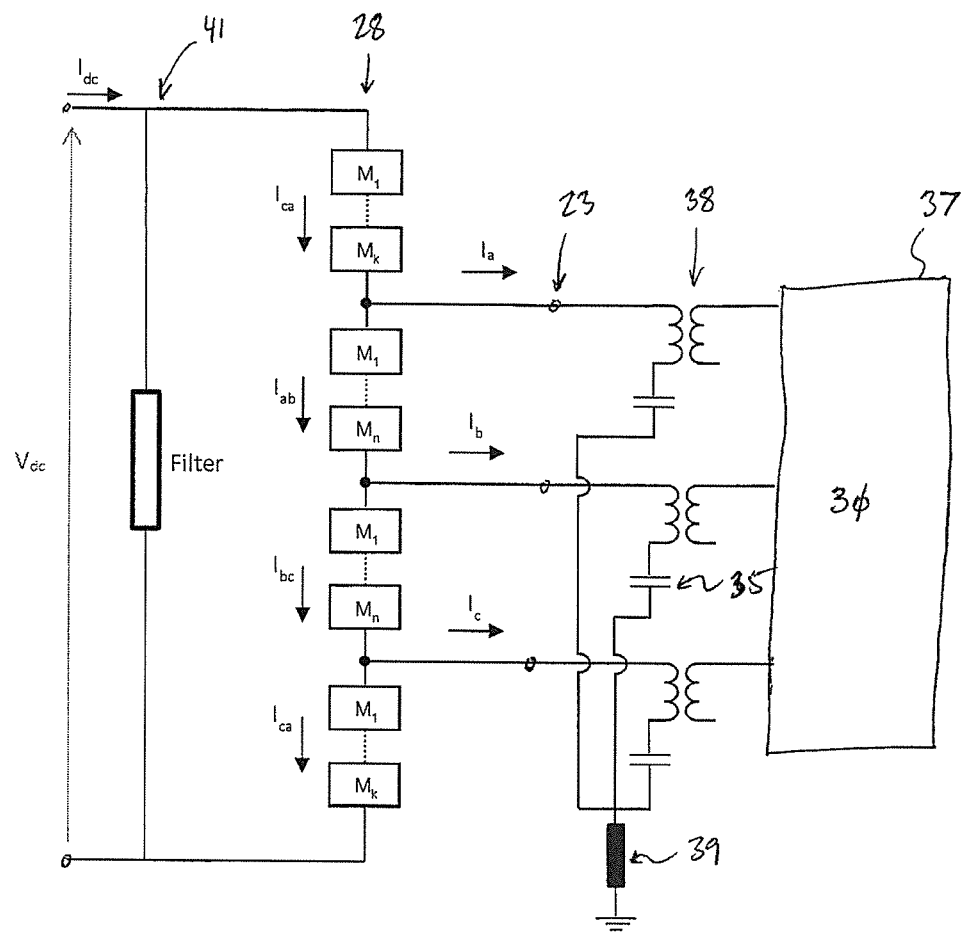
FIG. 8 is a schematic diagram of voltage sourced converter according to an arrangement of the present invention, with capacitors in series with transformer windings at a neutral connection side of the transformer windings.

Alternatively to inserting the capacitive element between the respective AC terminal 23 and its corresponding connection 31 to the module chain, a capacitive element may be inserted in a manner which effectively places the element along this same path but outside of the VSC. That is, as shown in FIG. 8 a capacitive element 35 (capacitor) can be connected in series with each of the transformer windings but on the end of the winding not connected to the converter. In the example shown in FIG. 8 the transformer windings and capacitors are connected in a Y arrangement. The neutral point of the Y arrangement may be left open or connected to ground directly or through an impedance 39. Generally the series combination of transformer winding and the capacitor can be connected either in Delta or Y. Such an arrangement placing the DC-blocking capacitive elements on the neutral connection side of the transformer may reduce cost of the VSC.

The voltage sourced converter of the illustrated arrangements includes an AC path 41 across the two connections 21A, 21B of the DC terminal for reducing propagation of the AC current to the DC terminal by providing a closed loop within the VSC around which AC current can circulate.

Figure 9:
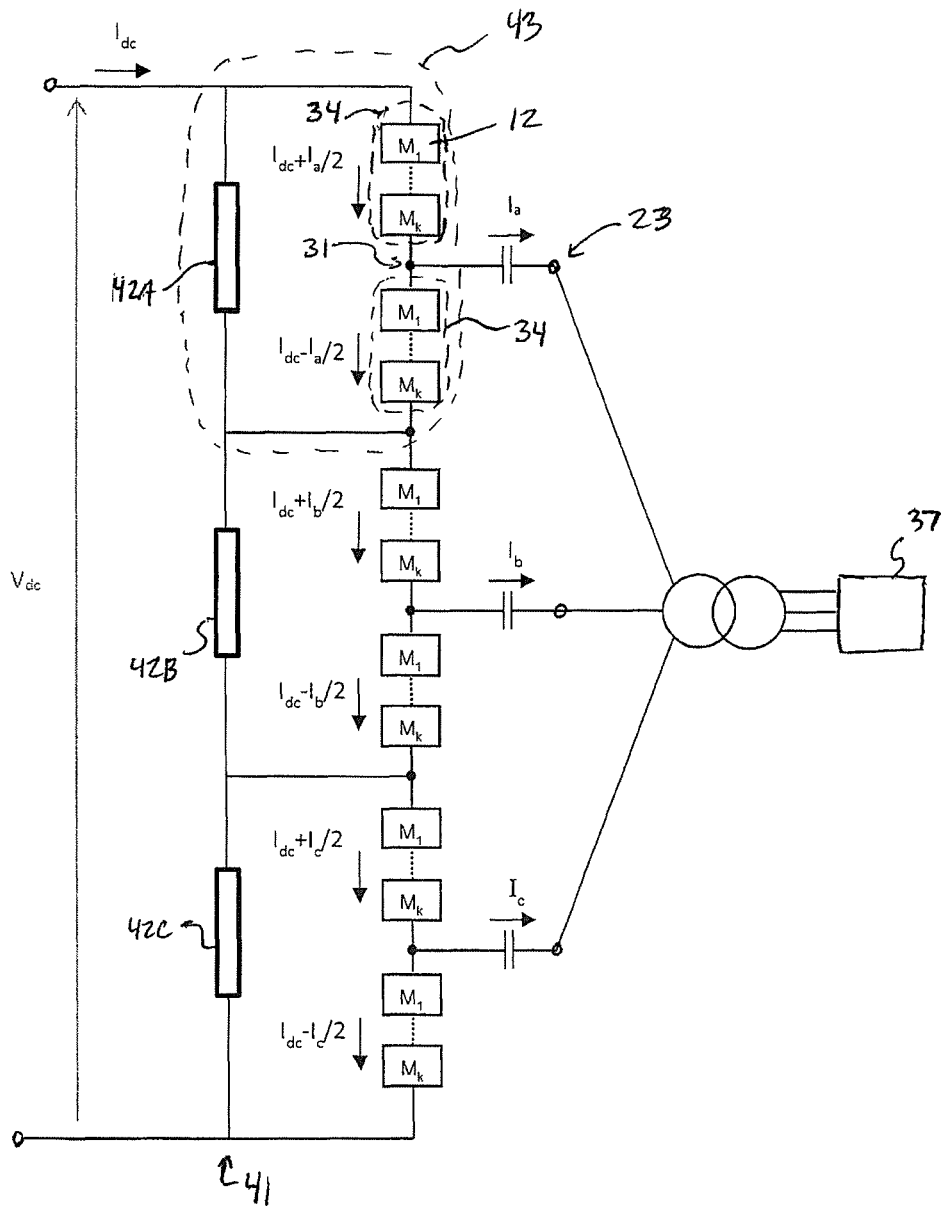
FIG. 9 is a schematic diagram of voltage sourced converter according to an arrangement of the present invention, with three fundamental frequency filters one for each phase.
Figure 10:
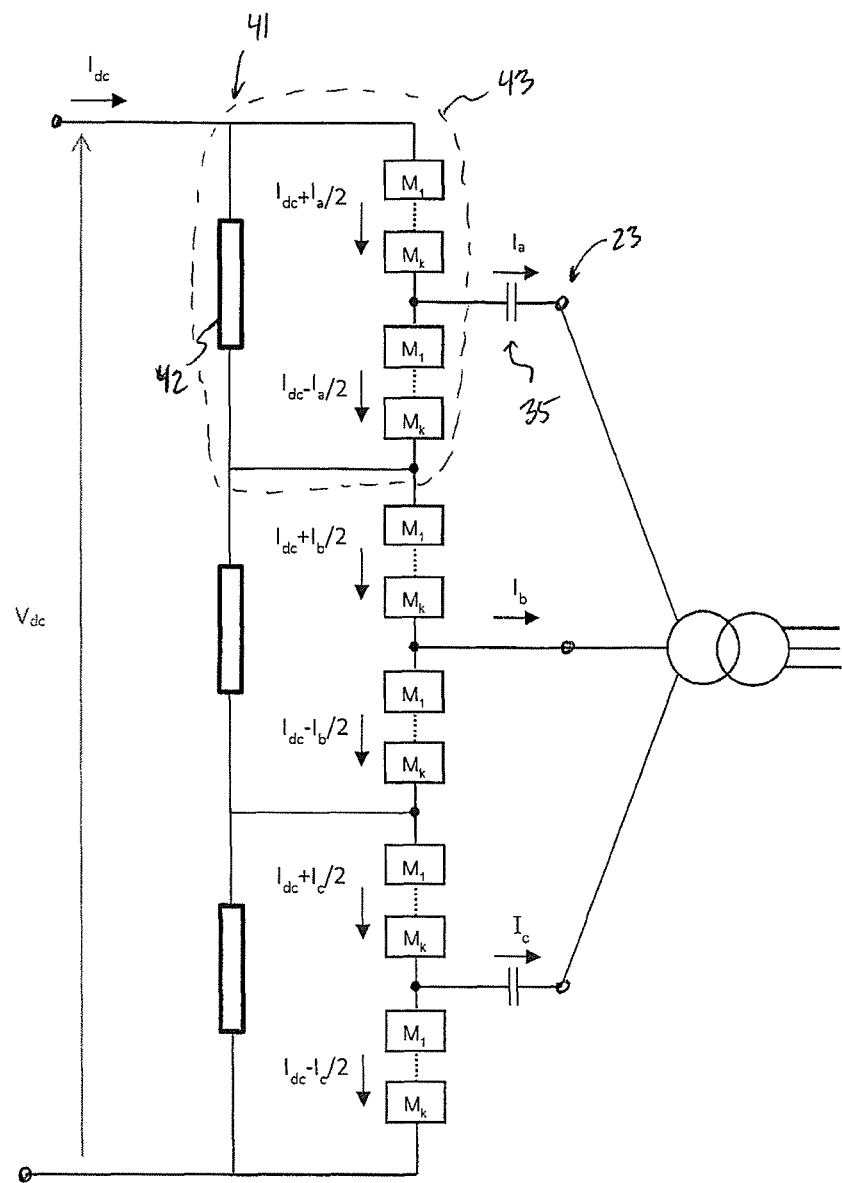
FIG. 10 is a schematic diagram of voltage sourced converter according to an arrangement of the present invention, with series capacitors on only two phases and having three FF filters used.

The AC path 41 may be formed by a fundamental frequency (FF) filter 42 which provides a low impedance path for the AC currents having the same frequency as that of the AC terminals, which in other words is the fundamental frequency. In FIGS. 5-8 is shown an AC path comprising a single FF filter 42 connected in parallel with the chain 28 of modules. In FIGS. 9 and 10 is shown another arrangement of the AC path in which there is provided a fundamental frequency filter 42 for each phase defined by the respective AC terminal 23. Each fundamental frequency filter is connected in a manner forming a closed loop 43 with the respective AC terminal 23 and the anus 34 on either side of the connection 31 thereof.

Figure 11:
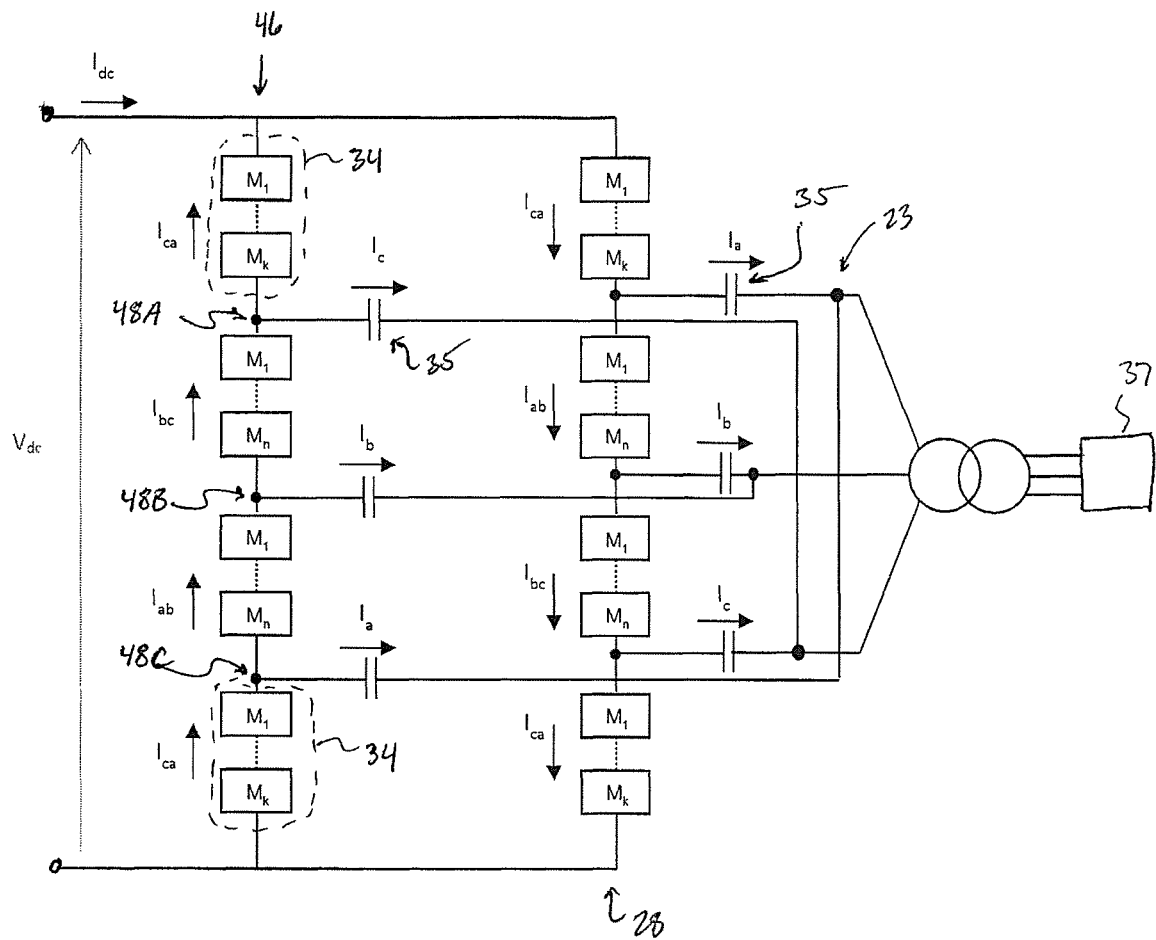
FIG. 11 is a schematic diagram of voltage sourced converter according to an arrangement of the present invention, with two chains of modules and no fundamental frequency filter.

In a further arrangement of the VSC as shown in FIG. 11 there is provided another chain 46 of power electronic modules 12 which like those forming the first chain 28 are operatively controlled by the controller 25 and connected between the two connections 21A, 21B of the DC terminal. As such, a portion of the DC current which passes through the DC terminal 21 passes through this second chain 46 of modules, and another portion of the DC current passes through the first chain 28 of modules.

In the arrangement of FIG. 11 the AC terminals 23A-23C are connected to the second chain 46 at prescribed locations 48A through 48C between the modules 12 so that on either side of each connection 48A, 48B, and 48C is formed an arm 34 of the modules comprising a prescribed number of the modules 12. Similar, if not the same, considerations are made in determining how many modules are used in one arm, and typically the prescribed number of the modules in the additional chain is related to the sum of the magnitude of the peak AC voltage and the DC voltages across the arm.

In the two chain arrangement which is illustrated in FIG. 11 there is a separate capacitive element 35 in each path between the respective chain and the respective AC terminal 23 as there are two such paths therebetween, one for each chain. In another arrangement of this type of two chain configuration any one of the DC-blocking capacitive elements may be omitted, and the remaining DC-blocking elements still serve to block propagation of DC current into and out of the AC terminals.

The modules 12 of the second chain 46 provide additional AC current to the AC terminals 23 so that more power can be transferred between the AC and DC sides versus the VSC configuration which has only a single chain 28 of modules.

The modules of both chains 28 and 46 are controlled by the controller 25 such that the AC current leaving the chain 28 enters the chain 46 hence there is substantially no AC current passing through to the DC terminal 21 thereby substituting for the FF filter of the other arrangements.

In the arrangement shown in FIG. 11 the AC terminals of the two chains 28 and 46 are connected to the same nodes 23. In other arrangements (not shown) they may be separated and connected to separate transformers, loads or AC systems.

It will be appreciated that in some arrangements, which are not shown, flow of AC current into the DC system is allowed and therefore an AC path may not be used.

As previously mentioned the power electronic modules 12 can be half bridge, full bridge, semi-full bridge or any other kind usable in a MMC converter. Each module 12 may include one or more capacitors 13 and a number of electronic switches 15 that allow or stop the flow of current through the module terminals 17, 18 and the capacitor or capacitors. These electronic switches may be IGBT, IGCT, IEGT, thyristor, diode or other electronic switches. Each switch may comprise only one or multiple of these devices connected in series or in parallel.

According to one arrangement of the invention, in series with each AC terminal 23 there is a capacitor 35 which is then connected to the AC load or AC power system 37. These capacitors prevent DC current flow from the converter to the AC load or the AC power system.

In another arrangement like that of FIG. 8 the VSC is connected to the AC load or AC power system through a set of transformers. There is a capacitor in series with each secondary transformer winding. The windings may be connected either in Y or Delta. If windings are connected in Y the neutral point of the Y connection can be left open or connected to ground either directly or through an impedance (such as a resistor, reactor, capacitor, or arrester). In the example of FIG. 8 the VSC is connected to the AC system or load 37 through three single phase transformers. There is a capacitor 35 in series with each of the converter side windings (secondary windings) of these transformers. In this example the windings are connected in Y and the neutral point of the Y is connected to ground through an impedance.

In another arrangement of the VSC of the present invention, one of the AC connections does not have a capacitor 35 in series. If the current in AC terminals are required to be balanced, i.e. equal in magnitude, properly selected reactances can be added in series with each phase. The phase currents can also be made to balance by proper control of the converter.

The VSC of the present invention may also include one or more Fundamental Frequency (FF) filters. Such filter is designed to provide a low impedance path to the AC currents that are at the same frequency as the AC terminal, i.e. the fundamental frequency. According to one arrangement of the VSC, one FF filter is connected between the DC terminal connections. FIG. 5 shows a three phase VSC example of such an arrangement with series capacitors at all three AC connections and one FF filter at the DC terminal. With reference to FIG. 5, in this arrangement the modules connected between phase A and phase B are controlled to carry $I_{dc}+I_{ab}$, modules connected between phase B and phase C are controlled to carry $I_{dc}+I_{bc}$, modules connected between phase A and the DC terminal and modules connected between phase C and the DC terminal are controlled to carry $I_{dc}+I_{ca}$. The low impedance current path provided by the FF filter allows majority of $I_{ca}$ flow from one connection of the DC terminal to the other.

Figure 7:
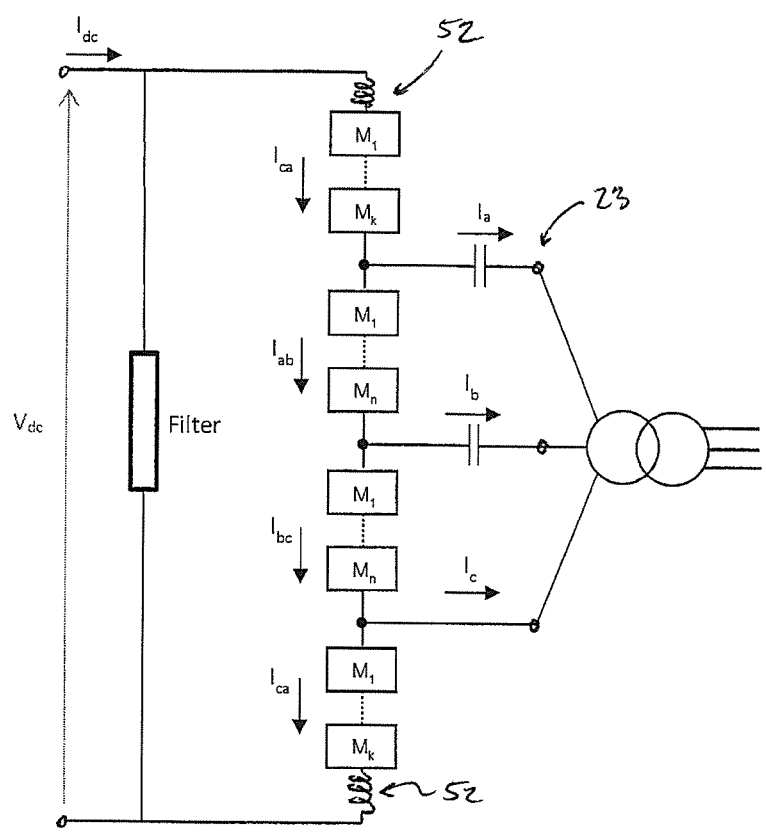
FIG. 7 is a schematic diagram of voltage sourced converter according to an arrangement of the present invention, with series capacitors at all but one of the AC connections.

FIG. 7 shows another arrangement where there is a series capacitor at all AC connections except for one. Any of the AC connections can be left without a series capacitor, in this example phase C is directly connected to the transformer without a series capacitor. Similar to FIG. 5 this example has one FF filter at DC terminals. In both these examples the AC terminals are connected to the AC power system through a transformer. Transformer windings can be connected in any format. In a three phase system the commonly used Y and delta (Δ) connections are possible both for the primary and secondary windings. In another arrangement of the VSC a FF filter is connected across the modules associated with each AC phase. For example in a three phase VSC there are three FF filters 42A through 42C. FIG. 7 shows a three phase VSC example of such an arrangement with a total of three FF filters, one for each phase. With reference to FIG. 9, in this arrangement the modules connected between the phase A and the connection point of the first filter 42A are controlled to carry $I_{dc}-I_a/2$; modules connected between the same filter connection point and the phase B connection are designed to carry $I_{dc}+I_b/2$; the difference between these two currents will flow into the FF filter. Similarly the modules between phase B and the connection point of the second FF filter 42B are controlled to carry $I_{dc}-I_b/2$ and modules connected between this second filter connection point and phase C connection are controlled to carry $I_{dc}+I_c/2$, the difference between these two currents flows into the second FF filter. Other FF filters operate based on the same principle. FIG. 10 shows the same converter with one of the series capacitors removed.

In another arrangement two or more converters can be connected between the DC terminal connections. The connection points for the phases are selected such that with proper control of the branches the need for the FF filter is removed. FIG. 11 shows an example converter with two chains of modules and without an FF filter.

In all arrangements mentioned a reactor 52 can be connected in series with all or some of the converter arms as for example shown in FIG. 7 where for illustrative purposes only two reactors 52 are shown in an uppermost one of the arms and a lowermost one of the arms.

The VSC can be configured in symmetrical monopole, asymmetrical monopole, rigid bipole or regular bipole or other arrangements. This converter technology does not impose a limitation on how the HVDC system needs to be configured.

Since various modifications can be made in my invention as herein above described, and many apparently widely different arrangements of same made, it is intended that all matter contained in the accompanying specification shall be interpreted as illustrative only and not in a limiting sense.

The invention claimed is:

1. A voltage sourced converter comprising: a plurality of AC terminals and a DC terminal between which electrical power is transferred; a plurality of power electronic modules each including at least one capacitive element arranged to maintain a predetermined voltage and electronic switches operatively connecting the at least one capacitive element to terminals of the respective module such that current can be guided through or to bypass the at least one capacitive element; the modules being connected in a single chain between two connections defining the DC terminal such that DC current passing through the DC terminal passes through the chain of the modules; the AC terminals being connected to the chain at prescribed locations between the modules in the chain so that on at least one side of each connection is formed an arm of the modules; a plurality of DC-blocking capacitive elements each connected between a respective one of the AC terminals and the corresponding respective connection at the chain such that the DC current passing through the chain is prevented from propagating out of the AC terminals beyond the converter;

a controller for controlling the modules so as to (i) form an AC voltage waveform at each AC terminal, (ii) maintain the predetermined voltage of each of the at least one capacitive element of the respective module, and (iii) maintain a total voltage of all the modules of the chain substantially equal to a voltage at the DC terminal;

each arm including a prescribed number of the modules which is related to the sum of the magnitude of a peak AC voltage which can appear across the respective arm and a DC voltage drop across the respective arm.

2. The voltage sourced converter according to claim 1 including an AC path across the two connections of the DC terminal for reducing propagation of the AC current to the DC terminal.

3. The voltage sourced converter according to claim 2 wherein the AC path is formed by at least one fundamental frequency filter.

4. The voltage sourced converter according to claim 3 wherein there is provided a fundamental frequency filter for each phase defined by the respective AC terminal, the fundamental frequency filter being connected in a manner forming a closed loop with the respective AC terminal and the arms on either side of the connection thereof.

5. The voltage sourced converter according to claim 1 wherein there is provided a capacitive element connected between a respective one of the AC terminals and the corresponding respective connection at the chain so as to block propagation of the DC current to the respective one of the AC terminals.

6. The voltage sourced converter according to claim 5 wherein between each AC terminal and the corresponding respective connection at the chain is a respective one of the DC-blocking capacitive elements.

7. The voltage sourced converter according to claim 1 including a plurality of reactors each connected in series with the respective arm.

8. The voltage sourced converter according to claim 1 wherein there is an arm of the modules on either side of said each connection of a respective one of the AC terminals to the chain.

9. The voltage sourced converter according to claim 1 including:
  another single chain of power electronic modules connected between the two connections of the DC terminal such that DC current passing through the DC terminal passes through said another chain of the modules,
  wherein each power electronic module of said another chain includes at least one capacitive element arranged to maintain a predetermined voltage and electronic switches operatively connecting said at least one capacitive element to terminals of the respective module such that current can be guided through or to bypass said at least one capacitive element;
  the AC terminals being connected to said another chain at prescribed locations between the modules thereof so that on at least one side of each connection is formed an arm of the modules including a prescribed number of the modules such that the modules of said another chain additionally provide AC current to the AC terminals;
  a plurality of DC-blocking capacitive elements each connected between a respective one of the AC terminals and the corresponding respective connection at said another chain such that the DC current passing through said another chain is prevented from propagating out of the AC terminals beyond the converter;
  and the modules of both chains being controllable by the controller such that there is substantially no AC current passing through to the DC terminal.

10. The voltage sourced converter according to claim 1 wherein the module is of the type selected from the group consisting of half bridge, full bridge, and semi-full bridge.

11. The voltage sourced converter according to claim 1 wherein there are three AC terminals each for one phase of an AC system to which the voltage sourced converter is connected.

* * * * *